(12) United States Patent
Rand et al.

(10) Patent No.: US 11,150,866 B2
(45) Date of Patent: Oct. 19, 2021

(54) SYSTEMS AND METHODS FOR CONTEXTUAL AUDIO DETECTION AND COMMUNICATION MODE TRANSACTIONS

(71) Applicant: Synervoz Communications Inc., Ingleside (CA)

(72) Inventors: James Rand, Ingleside (CA); Nevo Segal, Copenhagen (DK)

(73) Assignee: Synervoz Communications Inc., Ingleside (CA)

( * ) Notice: Subject to any disclaimer, the term of this patent is extended or adjusted under 35 U.S.C. 154(b) by 0 days.

(21) Appl. No.: 16/681,493

(22) Filed: Nov. 12, 2019

(65) Prior Publication Data

US 2020/0150919 A1    May 14, 2020

Related U.S. Application Data

(60) Provisional application No. 62/760,181, filed on Nov. 13, 2018.

(51) Int. Cl.

| G06F 3/16 | (2006.01) |
| G10L 15/22 | (2006.01) |
| H04R 1/40 | (2006.01) |
| H04R 3/00 | (2006.01) |
| G10L 15/08 | (2006.01) |
| G10L 25/51 | (2013.01) |

(52) U.S. Cl.
CPC .............. *G06F 3/165* (2013.01); *G10L 15/08* (2013.01); *G10L 15/22* (2013.01); *G10L 25/51* (2013.01); *H04R 1/406* (2013.01); *H04R 3/005* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 2003/0152093 A1* | 8/2003 | Gupta | H04L 65/604 370/412 |
| 2010/0088094 A1* | 4/2010 | Wang | G10L 25/78 704/233 |
| 2014/0278389 A1* | 9/2014 | Zurek | G10L 15/20 704/231 |
| 2015/0009865 A1* | 1/2015 | Sharma | H04L 65/403 370/277 |
| 2015/0348539 A1* | 12/2015 | Yamamuro | G10L 15/26 704/251 |
| 2019/0051299 A1* | 2/2019 | Ossowski | G10L 15/08 |

* cited by examiner

*Primary Examiner* — James K Mooney
(74) *Attorney, Agent, or Firm* — Orin Del Vecchio (57) ABSTRACT

Systems and methods for Contextual Audio Detection, wherein Contextual Audio Detection includes detecting specific sounds using Adjustable Parameters and using the output to control audio routing, input parameters, and other features.

19 Claims, 2 Drawing Sheets

SYSTEMS AND METHODS FOR CONTEXTUAL AUDIO DETECTION AND COMMUNICATION MODE TRANSACTIONS

PRIORITY UNDER 35 U.S.C SECTION 119(E) & 37 C.F.R. SECTION 1.78

This nonprovisional application claims priority based upon the following prior United States Provisional patent application entitled: Systems And Methods For Contextual Audio Detection And Communication Mode Transitions, Application No. 62/760,181 filed Nov. 13, 2018, in the name of James Rand, which is hereby incorporated by reference for all purposes.

FIELD OF THE INVENTION

The present invention relates generally to audio systems and more specifically to systems and methods for Contextual Audio Detection, wherein Contextual Audio Detection includes detecting specific sounds using Adjustable Parameters and using the output to control audio routing, input parameters, and other features.

BACKGROUND OF THE INVENTION

Audio detection encompasses signal processing techniques concerning the electronic representation of sound waves. It includes techniques used to identify specific sounds and encompasses the technologies and techniques used in subfields such as speech processing. Speech processing is an important branch of digital signal processing that incorporates specific audio detection techniques such as voice activity detection, speaker identification, automatic speech recognition, and more. We use the term Contextual Audio Detection in reference to audio detection techniques, methods, and systems that are capable of adaptation based on contextual information.

Due to the proliferation of voice interfaces in new and portable form factors such as smart headphones, wireless earbuds, smart speakers, smart watches, etc. ("audio devices"), there is a growing need for improved audio detection and audio processing techniques. By analyzing signals received through the microphones embedded in such devices it is possible to determine valuable contextual information such as what type of environment the user is in (e.g. indoors, outdoors), whether there are other people nearby (e.g. detecting speech), whether specific people are nearby (e.g. detecting a specific speaker's voice), whether someone is trying to get the user's attention (e.g. detecting the utterance of a user's name or a specific phrase), whether specific objects are nearby (e.g. recognizing a siren suggests an emergency vehicle is nearby), and more.

In using Audio Detection Technologies, or "ADTs" (further defined below) to better understand a user's context and environment, various settings can be updated to improve an end user's experience. Each ADT and/or method for audio detection has strengths and weaknesses depending on the specific hardware and use case. Additionally, any given audio device might need to support multiple use cases. The efficacy of an ADT or method in each such use case is affected by input assumptions, Environmental Factors (further defined below), hardware constraints, and limitations of the ADT itself. There is no single ADT, process, or method that is effective across multiple use cases/applications.

Accordingly, there is a need for a flexible system that connects the Audio Detection Technologies together with easily Adjustable Parameters (further defined below) to help balance tradeoffs among Environmental Factors and Performance Constraints (further defined below). Additionally, because end users can change environments, hardware configuration, and use cases in real time, there is a need for a system that detects these changes and that can dynamically update parameters to favor ADTs and methods that work best for the current combination of environment, hardware, and use case.

SUMMARY OF INVENTION

According to an embodiment of the present invention, there is provided an audio device for Contextual Audio Detection and mode switching, comprising: an audio input device, that receives an audio signal stream from the environment of the audio device and provides such audio signal stream to an audio detection system; an audio detection system, comprising a processor and non-transitory memory with computer instructions thereon, the audio detection system configured to: accept the audio signal stream; process the audio signal stream using one or more Audio Detection Technologies (ADTs); and use a set of Adjustable Parameters to update Decision Logic, the Decision Logic being a set of instructions that performs one or more of: updating instructions for processing the ADTs; updating instructions for processing Output Controls, Output Controls comprising one or more outputs from the audio detecting system; and a combination thereof.

According to a further embodiment of the invention, there the audio detection device may further comprises one or more Modes and Triggers that are used to modulate the Adjustable Parameters and the Decision Logic; a set of Environment Settings, the Environmental Settings comprising groupings of one or more of: Adjustable Parameters, weights, thresholds, and the Decision Logic that are used to modulate a set of Per-Output Weights, each Per-Output Weight comprising a variable that modulates the relative influence of each ADT, and a set of use-case-specific Conversation Modes, the Conversation Modes comprising groupings of one or more settings, threshold values, scores, and Decision Logic.

The Conversation Modes may include one or more of:
a Full-Duplex Conversation Mode where full duplex communication is enabled and one of the users has spoken recently;
a Half-Duplex Conversation Mode where half-duplex communication is enabled and one of the users has spoken recently;
a Silence Mode where users are connected in a VoIP conversation but one of the users has not spoken recently;
a Proximate Mode where it has been determined that users are in close physical proximity to one another;
a Hands-Free Mode where one or more wake word detection, speech detection, and natural language processing is prioritized;
a Headphones Mode where it has been detected that all users are wearing headphones; and
a Music Mode where it has been determined that the user is listening to music.

According to another embodiment of the present invention, there is provided A method of Contextual Audio Detection for an audio device, comprising: providing a set of instructions containing one or more Audio Detection Technologies (ADTs) and one or more adjustable ADT parameters; using the set of ADT parameters as inputs for computing the Audio Detection Technologies; extracting features from an audio signal and passing the features into one or more of the ADTs; and constructing a supervector from the outputs of the ADTs.

According to a further embodiment of the invention, the method may further comprise passing the supervector to a set of instructions to update parameters that can be used to help control the relative influence of each ADT. Alternatively, the method may further comprise passing the supervector to a set of logical instructions, code, variables, or decision logic to affect one or more of: a first set of gates that determine whether or not to send a voice audio signal over a network; a second set of gates that turn noise cancellation on headphones on or off, and other controls that modulate noise cancellation; a third set of gates that control whether or not ambient sounds are admitted to a headset via a locally connected microphone and other controls that modulate the volume of the ambient signal or apply effects to the ambient signal; and one or more controls that apply effects or modulate the audio volume and other aspects of media on another device.

According to still another embodiment of the present invention, there is provided a method of Contextual Audio Detection, comprising: providing an input audio signal; passing the audio input to one or more Audio Detection Technologies (ADTs); computing the Audio Detection Technologies; and using the results obtained from the ADTs to update instructions comprising one or more of: providing a set of Adjustable Parameters & additional Decision Logic that modulates one or more Output Controls; how the Audio Detection Technologies are processed; and a combination thereof; and providing Modes and Triggers that are used to modulate the Adjustable Parameters and Decision Logic.

According to a further embodiment of the invention, the method may further comprise providing a set of ADT Parameters that determine how each of the ADTs will be run (e.g. for how many buffers); providing a set of Output-Based Gates which determine which of the ADTs will be run (e.g. energy intensive or time consuming ADTs could be ignored when they are not required); and receiving an audio signal through a microphone or microphone array; and executing one or more of the following steps: preprocessing the input audio data and optimizing it for analysis; extracting features from the audio signal, copying them, and routing them to multiple ADTs to be processed in parallel; computing ADTs and outputting relevant scores, error functions, and decision variables ("ADT data"); feeding ADT data into a supervector which is in turn referenced by Output Controls; weighting ADT data for each Output Control according to its relevance; comparing the weighted ADP outputs against a threshold; using the ADP outputs to drive Decision Logic that modulates Output Controls; using Environment Settings (groupings of Adjustable Parameters, weights, thresholds, and Decision Logic) to influence which of the ADTs are emphasized; manually selecting the Environment Settings; automatically selecting the Environment Settings using an Automatic Environment Classifier that computes the environment from features extracted from the audio signal; updating thresholds and decision logic through Conversation Modes, where Conversation Modes are sets of instructions that depend on one of more of speech detection, whether a remote peer is connected, and Environment Settings; and updating ADT Parameters and Output-Based Gates through Conversation Modes.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF DRAWINGS

Reference will now be made to the accompanying drawings which show, by way of example only, embodiments of the invention, and how they may be carried into effect, and in which.

DETAILED DESCRIPTION

The present invention comprises an audio input device (such as a microphone or a microphone array) that receives an audio signal stream from the environment of the audio device and provides the audio signal stream to an audio detection system. The audio detection system comprises a processor and non-transitory memory with computer instructions thereon, the audio detection system configured to accept the audio signal stream, process the audio signal stream, and to determine an an audio signal action. The instructions contain a set of Adjustable Parameters that can be easily configured to optimize system performance.

In specific embodiments of the invention the Audio Detection Technologies (ADTs) are used for the detection of human voice and/or for the detection of a specific user's voice in different environmental conditions, hardware configurations, and use cases. In embodiments including voice detection technologies, Adjustable Parameters may include elements such as: hangover, hangbefore, Voice Activity Detection (VAD) thresholds and listening period; all of which are further defined below and may exist in prior art. The current invention contemplates unique combinations and implementations of these parameters and technologies as well as new parameters such as Per-Output Weights (further defined below) and Output-Based Gates (further defined below). These new features and combinations allow for efficient adaptation to changing environments, hardware configurations, and use cases. In addition, the overall system design provides a basis for automatically adapting parameters and Output Controls (further defined below) to different environments, hardware configurations, and use cases.

Audio detection can serve as the basis for making decisions about all inputs and outputs of a system (hereinafter referred to as "Decision Logic"). Decision Logic may refer to a set of instructions or logical operations that determine how input audio is processed, where to route output audio, how audio channels are mixed together on audio devices, when to apply audio effects, as well as a basis for when to run processes unrelated to audio. For example, the detection of specific audio events in the vicinity of a device can be used in logical operations and computations (i.e. the Decision Logic) to open and close gates, apply filters, modulate volumes, adjust gains, and more. In cases where the variables controlled by the Decision Logic are system outputs, we refer to them as Output Controls.

Output Controls could refer to logical instructions, code, variables, or any set of instructions that interact with Decision Logic. Some examples of Output Controls include:
- Gates that determine whether or not to send a voice audio signal over a network. (see, e.g. "Network" in FIG. 2)
- Gates that turn noise cancellation on headphones on or off, and other controls that modulate it (see, e.g. "Noise Cancellation" in FIG. 2)
- Gates that control whether or not ambient sounds are admitted to a headset via a locally connected microphone and other controls that modulate the volume of the ambient signal or apply effects to it (see, e.g. "Ambient Mic Transparency" and "Ambient Mic Filters" in FIG. 2)
- Controls that apply effects or modulate the audio volume and other aspects of media on another device (see, e.g. "Music Ducking" in FIG. 2)

While solutions may already exist that help drive logic for each of the above output controls, these use cases or scenarios are at best limited to where a fixed set of assumptions are used. Furthermore, these solutions are enabled through a variety of Audio Detection Technologies ("ADTs", further defined below). The present invention seeks to address scenarios where a fixed set of assumptions does not work well due to environments and use cases that change dynamically.

It is also important to note that ADTs that are particularly useful for the examples above may relate to voice detection. Specific embodiments in this specification describe voice detection technologies and techniques as the basis for Decision Logic, but other ADTs could be used in similar fashion. Additionally, Decision Logic can be used to drive both Output Controls and any other aspect of the system, including the inputs to the ADTs, for example.

The methods used to process the audio signal stream may be based on existing methods, in particular individual Audio Detection Technologies (ADTs) and the methods used for each ADT. ADTs often operate by extracting features from audio signals and processing them using a variety of methods. Some of these features include: Energy, spectral flatness, zero-crossing rate, mel frequency cepstral coefficients (MFCCs), spectral centroid, spectral flux, spectral roll off, and more. ADTs generally use specific features and processes to achieve a desired result, such as detecting the presence of voice or not. There are many pre-existing ADTs and techniques that may be relevant to the present invention. These include energy-based Voice Activity Detectors (VADs), machine-learning based VADs, gaussian mixture models, RNN-based VADs, speech recognition, speaker identification, text-dependent speaker verification, text-independent speaker verification, specific sound recognition, and other related technologies and techniques. These can be used together to enhance accuracy and combined in new and unexpected ways to augment overall functionality. While many of the specific ADTs and techniques mentioned below are known, aspects of the present invention use specific implementations and combinations of these ADTs and techniques to achieve desired results.

Depending on the application, there are a variety of Performance Constraints to consider when optimizing a system's performance for a given set audio detection processes. Performance Constraints are limitations on a given system or process that lead to trade-off considerations and a need for overall system or process flexibility. Some Performance Constraints may include:
- Power consumption
- Local processing capacity
- Latency associated with processing in the cloud (particularly if there is reliance on a third party)
- Latency associated with digital signal processing (DSP) methods
- Network latency
- Relative accuracy of alternative DSP methods and ADTs.
- Ease of use requirements (for instance, is the user required to train or calibrate the system).
- Microphone and other audio input/output hardware quality
- Number and location of microphones (e.g. in headset, on phone, spatial separation, etc.)
- Presence and proximity of other audio input devices (e.g. multiple phones in same room)
- Whether a communications network is online or offline (e.g. Bluetooth, Wi-Fi mesh network, intranet, etc.)
- Availability of sensors other than microphones to help improve accuracy of voice detection (e.g. detecting mouth movement via camera), for general presence detection (e.g. keyboard activity), or to use as an alternative to voice detection (e.g. a button or gesture).
- Availability of sensors to augment experiences: e.g. GPS to determine proximity to another user and ability to use this to influence audio volumes.
- Availability of sensors to allow for use of gestures (e.g. double tap on headphones to cause the system to listen for a wake word without letting other call participants hear the utterance of the wake word).
- Availability of sensors to establish and control communications (e.g. Gyro+GPS+accelerometer to infer line of sight, and unmuting a voice connection with the user in line of sight). These provide alternatives to using voice detection in some cases.

Additionally, a variety of Environmental Factors determine which technology, method, or combination would work best to produce a desired result. Some of these Environmental Factors may include:
- The presence of a noise floor
- Common noise patterns that are easily recognizable (e.g. motorcycle, airplane, wind)
- Random variability in noise
- Whether there are desirable elements in the background audio signal (e.g. specific voices or sounds that a user wishes to hear)
- Other noise environment characteristics
- Whether there is an ongoing VoIP call
- Whether the VoIP call is between two people or a larger group of people, as well as their hardware configurations and environmental conditions.
- The relative importance of the aforementioned Performance Constraints to the specific use case.

The embodiments of the systems and methods described herein may be implemented in hardware or software, or a combination of both, such as on audio devices. These embodiments may be implemented in computer programs executing on programmable computing devices part of audio devices or in communication with audio devices, each computing device including at least one processor, a data storage system (including volatile memory or non-volatile memory or non-volatile memory or other data storage elements or a combination thereof), and at least one communication interface.

Program code may be applied to input data to perform the functions described herein and to generate output information. The output information is applied to one or more output devices, in known fashion.

Each program may be implemented in a high-level procedural or object-oriented programming or scripting language, or both, to communicate with a computer system. Alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computing device, for configuring and operating the computing device when the storage media or device is read by the computing device to perform the procedures described herein. Embodiments of the system may also be considered to be implemented as a non-transitory computer-readable storage medium, configured with a computer program, where the storage medium so configured causes a computing device to operate in a specific and predefined manner to perform the functions described herein.

Furthermore, the systems and methods of the described embodiments, or portions thereof, may be capable of being distributed in a computer program product, app including a Contextual Audio Detection process, or SDK for development, including a physical, non-transitory computer readable medium that bears computer usable instructions for one or more processors. The medium may be provided in various forms, including one or more USB keys, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

Figure 1:
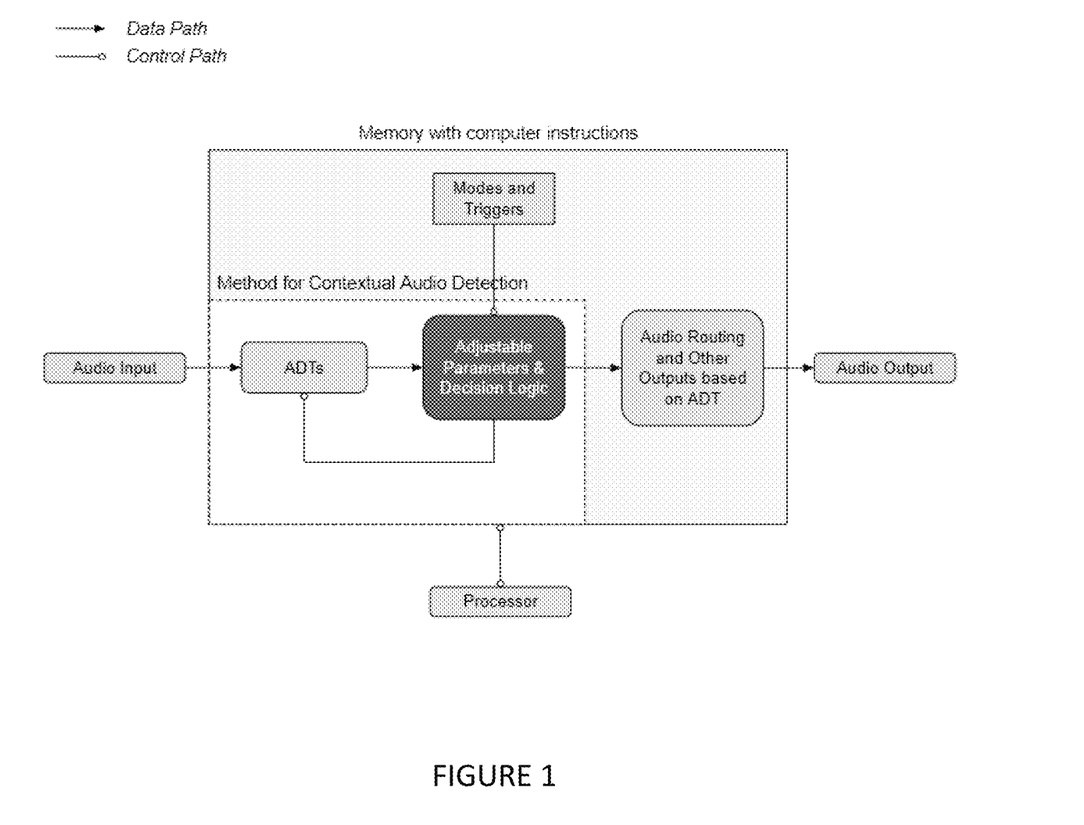
FIG. 1 is a block diagram of an audio system according to an embodiment of the present invention.

One aspect of the present invention as shown in FIG. 1 is a system comprising an audio input. Another aspect of the present invention is a method comprising steps, acts, or operations of processing the audio input for Contextual Audio Detection; the method using one or more Audio Detection Technologies (ADTs) in combination with a set of Adjustable Parameters (further defined below) and Decision Logic. The Decision Logic may be used to control 1) audio Output Controls (which may include audio routing and other controls such as those described above); 2) how the Audio Detection Technologies are processed; or 3) a combination of both 1 and 2. The Adjustable Parameters and Decision Logic can optionally be controlled by Modes and Triggers. Modes and Triggers generally refer to groups of settings, variable values, and detected events that can be used in logical operations to determine appropriate values for Adjustable Parameters and to help drive Decision Logic.

Referring to FIG. 1, the steps in performing Contextual Audio Detection may comprise:

Providing (or receiving) an input audio signal;
Passing the audio input to one or more Audio Detection Technologies (ADTs), depending on the active outputs;
Computing the Audio Detection Technologies;
Performing Decision Logic based on results obtained from the ADTs;
Providing a set of Adjustable Parameters & additional Decision Logic that modulates the Output Controls (including audio routing and other controls such as those described in the background); or how the Audio Detection Technologies are processed; or a combination of both; and
Optionally providing Modes and Triggers that are used to modulate the Adjustable Parameters and Decision Logic.

The system and method may be included as a component of a device or group of devices taking on a variety of factors including but not limited to smart speakers, smart headphones, regular headphones, mobile phones, laptop and desktop computers, gaming consoles, automotive dashboards, wristbands, and other wearable devices. Voice interfaces including speakers and a microphone continue to evolve and the present invention is generally suitable for being embedded in any voice interface.

Audio Detection Technologies (ADTs) and Techniques:

As discussed above, embodiments of the present invention may incorporate existing ADTs. Such ADTs often use techniques whereby certain features are extracted from an audio signals including:

Energy: Energy is the sum of magnitude spectrum values over a preset range of bins; it represents the loudness of an audio segment. A signal-to-noise ratio, calculated by dividing the energy of the current sample to an average calibrated energy of background noise, can be used as part of a simple, effective VAD.

Spectral Flatness: Spectral flatness measures the distribution of spectral values and is calculated by dividing the geometric mean of spectral values by the arithmetic mean [4]. Tonal sounds, including speech, have flatter spectra and result in lower spectral flatness, while noises have sharper peaks and troughs in their spectra and, therefore, result in higher spectral flatness.

Zero-crossing rate: Zero-crossing rate (ZCR) is the number of times the sound wave, graphed transversely, passes the resting zero line. ZCR of noise is greater than that of speech.

Mel-frequency cepstral coefficients (MFCCs): A Cepstral representation of an audio clip (i.e. the power spectrum of a sound). They are the amplitudes of a spectrum resulting from a transformation process.

Other features useful in voice detection include spectral centroid, spectral flux, spectral roll-off, and more.

These features are only listed for context. They will not be described in more detail because they are merely features that can be used as components of the various ADTs and techniques that are themselves only one aspect of the system. Existing methods also exist to process these features in ways that are useful to the present invention, especially with respect to voice detection. Each of these ADTs and similar ADTs could be included (or not, as desired) in the ADT component of the overall system (see FIG. 2).

Simple VADs: Simple VADs refer to non-Machine Learning based voice activity detectors (Non-ML VADs). Non-ML VADs operate by computing features based on an audio segment, then comparing them against threshold(s). A simple energy-based VAD is an example, whereby the energy of the incoming signal is determined to be above or below a given threshold.

Machine Learning based VADs: Machine Learning based VADs (ML VAD) operate by computing features based on an audio segment and predicting whether the segment is speech or not using a trained ML model. The probability output from the ML algorithm is compared against a threshold. A ConvNet is a specific example of a neural network that can be used in the design of an ML VAD.

Gaussian Mixture Models: GMMs are commonly used to model speech features and take Mel-frequency cepstral coefficients (MFCCs) as inputs. MFCCs are obtained from the spectrum of the logarithm of a Mel-filtered spectrum. Running a magnitude spectrum through a Mel filterbank redistributes the spectral values according to bins that relate to frequency resolutions perceived by humans: we can detect small changes in frequency better at low frequencies, hence the higher number of bins at low frequencies. By taking the log of the filtered magnitude spectrum, its components are isolated and can be quantified by taking yet another spectrum. In other words, properties related to the acoustic energy source of a speech utterance (i.e. the glottis) can be separated from those related to the filter (i.e. the shape of the vocal tract). After all, speech utterances are made by passing acoustic energy through the vocal tract that filters the sound to produce phonemes. Because these values help distinguish between phonemes and speakers, MFCCs are used for speaker identification and speech recognition. They are also used in VADs with a certain degree of success.

RNN-based VADs: Recurrent Neural Network based voice detectors are a focus of recent research. They take spectral features of an audio segment, such as MFCCs and magnitude spectra, as input and output the likelihood of speech. RNNs take spectral features from a sequence of audio samples into account and analyze temporal relationships. The neural units in each layer outputs to both itself and the next layer, allowing information from past time steps to persist in the same layer. RNNs can also incorporate long short-term memory units, enabling the learning of dependencies that span multiple time steps. This property of RNNs make them ideal for machine learning in audio applications.

Speech recognition: includes a variety of methodologies and technologies that enables the recognition and translation of spoken language into text by computers.

Speaker identification: AKA speaker recognition. Includes a variety of methodologies and technologies that distinguish between a set of known voices (or identifies the speaker as unknown). Speaker verification uses similar technologies and methods to accept or reject an identity claim.

Text-dependent speaker verification: the word sequence is assumed known to the system. This can improve performance but limits scope and introduces other limitations (e.g. typically used with wake words/prompted phrase/pass phrase).

Text-independent speaker verification: the word sequence is not known to the system and therefore the scope extends well beyond wake words (e.g. applies during normal conversation).

Specific sound detection: Includes a variety of methodologies and technologies that identify specific sounds by comparison to a database containing similar sounds.

Source separation: is the separation of source signals from a set of mixed signals, such as the 'cocktail party problem' where multiple people are talking simultaneously in a room (or into a single microphone) and a listener is trying to focus on a single speaker. Several recent techniques have made progress toward solving this problem.

Speaker-independent speech separation: a specific type of source separation, speech separation is the separation of a speech signal from a mix of environmental signals such as noise and other people speaking. It is particularly challenging in the case where there is only a single channel (e.g. a single microphone) to receive the audio data. Recent deep learning techniques have been used to make viable solutions to the problem of single microphone speaker independent speech separation.

Automatic Environment Classifier: technologies and methods exist to recognize ambient sounds and noises and correlate them with known environments. For example, it is possible to determine that the user (or microphone) is likely present in a quiet room, outdoors, or in another space for which sufficient audio data has been collected to be recognized as similar to the input audio signal.

Reverberation-based technologies to differentiate people speaking directly into microphone compared to someone in the same room but far from microphone.

Other Audio Detection Technologies and methods include Convolutional Deep Neural Networks (CLDNNs), Vector Quantization, Support Vector Machines, I-Vectors, and more.

Other Related technologies that might comprise parts of processes contemplated in the current invention include Natural Language Processing, Acoustic Echo Cancellation, Automatic Gain Control, Filter Banks, Reverb Attenuators, and more.

These examples are provided for context. That is, specific aspects of the present invention provide for the ability to switch between ADTs, weight their outputs, and otherwise organize them in novel ways that optimize overall system performance. Each of these ADTs, as well as others, could be used in specific embodiments of the invention.

The outputs from the ADTs ("ADT Data") would generally be a set of scores, but may include error functions and other variables that can be used in Decision Logic. The scores may be used to compare against a threshold to determine whether or not an event has taken place (e.g. a score related to energy might be above a certain threshold, thus indicating that a sound has been detected). Each score could be compared against multiple thresholds, depending on the output, environment, and use case.

Adjustable Parameters

ADT Parameters

One aspect of the present invention is a set of Adjustable Parameters that govern the operation of ADTs being used. The Adjustable Parameters can be used to alter the performance of any individual ADT, or they can be used to influence how the ADTs operate together (see FIG. 2). For example, specific embodiments of Adjustable Parameters that could be used to affect influence the operation of individual ADTs include:

Hangover: When a voice activity detector (VAD) is triggered (i.e. it detects voice), it remains triggered until it no longer detects voice. However, before the VAD becomes idle, it will remain open for a short duration, which can range from tens of milliseconds to a few seconds. Hangover ensures that the VAD does not clip the middle or the end of a voice segment. Word utterances with syllables that can be interpreted as noise, such as fricatives, would remain intact with a sufficient hangover. While hangover durations can be static, it is a good idea to vary the duration based on predetermined conditions. Adaptive (or variable) hangover balances the need to prevent clipping against blocking excess noise. Hangover duration can be set according to Environmental Factors including noise levels, or, in a specific embodiment of the current invention, according to the duration on the user's speech activity (see Conversation Mode—further defined below). If the system is confident that the user is actively talking, the need to prevent clipping is greater than blocking excess noise and, therefore, we extend the hangover duration.

Hangbefore: VADs with hangbefore extend voice segments a short duration before the point at which the VAD becomes triggered. Hangbefore ensures that words utterances starting with unvoiced consonants remain intact. It requires the VAD to remember past audio buffers. In a specific embodiment of the present invention, hangbefore is implemented with a speed varying mechanism that transmits audio at a slightly higher speed until the past buffers are depleted, at which point the audio transmission returns to normal speed. This speed increase can be designed to be imperceptible and mitigates potential latency issues.

Listening Period: Listening period refers to a duration of time that can be inferred from a combination of audio buffer size and number of buffers. For example, if a buffer is 2048 samples and the sample rate is 44,000 Hz, then it takes about 0.046 seconds per buffer, meaning roughly 20 buffers would be required to achieve a listening period of about 1 second. The listening period can be varied to balance accuracy and latency. A longer listening period would generally improve accuracy at the expense of latency. Depending on the specific audio detection methods used and Performance Constraints, there may be diminishing returns. The listening period used to drive Decision Logic can be optimized depending on what inputs or outputs are being affected. For example, a simple VAD might be triggered if only two consecutive buffers are above threshold, but 20 consecutive buffers might be required before changing Conversation Modes (defined further below).

VAD threshold: The system can adjust the final threshold of the voice detection to allow for more/less buffers to be categorized as voice. This is useful when users are already in conversation and it is not required to block non-voice as strongly.

The specific implementations of hangover, hangbefore, listening period, and VAD thresholds may be applied in certain embodiments of the present invention. Further embodiments may relate to the use of Modes and Triggers that allow for these parameters to be changed automatically in response to changing environments and use cases. For example, they could be implemented as components within "ADT Parameters" and/or "Threshold and Decision Logic" in FIG. 2.

Other Adjustable Parameters

In addition, Adjustable Parameters can be used to affect how the various ADTs are used together. For example:

Per-Output Weights ("weights"): Where more than one available technology is used in parallel, weights are one of the parameters (a variable) that can be used to help control the relative influence of each ADT when applying Decision Logic for each Output Control. (See FIG. 2).

Output-Based Gates: Output-Based Gates are a set of instructions that can be used to determine which of the ADTs to compute. Depending on which specific Output Controls are required, only a subset of ADTs may be required. To save on battery, processing, and to minimize latency, a subset of ADTs could be ignored when they are not required. (See FIG. 2).

Per-Output Weights and Output-Based Gates represent potential improvements over existing parameters. In addition to implementation in their own right, they may be applied as a design as part of a larger system that allows for their adaptation based on Environment Settings and Conversation Modes (each examples of Modes and Triggers that are further defined below).

Figure 2:
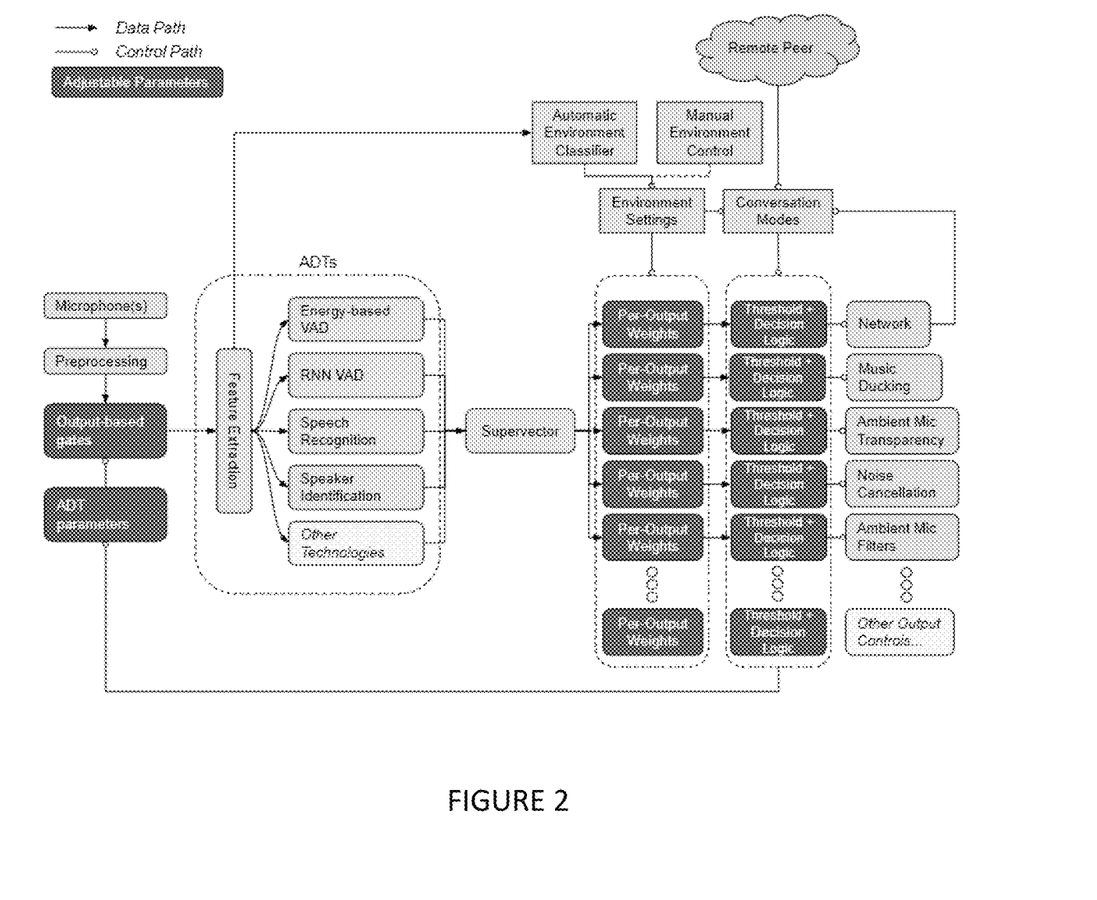
FIG. 2 is a block diagram of a configuration of the audio system of FIG. 1 according to an embodiment of the present invention.

There are many possible embodiments of the invention. Below we provide example embodiments for illustrative purposes. In one embodiment, the Audio Detection Technologies are configured as in FIG. 2:

The steps performed in FIG. 2 may comprise:

Providing a set of ADT Parameters that determine how each of the ADTs will be run (e.g. for how many buffers);

Providing a set of Output-Based Gates, which determine which of the ADTs will be run (e.g. energy intensive or time consuming ADTs could be ignored when they are not required);

An audio signal received through a microphone or microphone array;

Preprocessing the input audio data and optimizing it for analysis;

The relevant features for the selected ADTs (as determined from the Output-Based Gates) are extracted from the audio signal ("feature extraction"), copied, and routed to multiple ADTs to be processed in parallel;

The ADTs process the features and output ADT data;

The ADT data is fed into a Supervector, which is in turn referenced by each Output Control;

The ADT data is weighted for each Output Control according to its relevance;

Decision Logic is based on comparing the weighted result against a threshold for the Output Control and/or directly from the ADT data;

Decision Logic modulates each Output Control;

Environment Settings are used to determine the Per-Output Weights for each Output Control;

Environment Settings are optionally determined through the manual selection of a particular environment (e.g. a user selects from a list of possible environments) or the environment can be automatically classified using an Automatic Environment Classifier;

The Automatic Environment Classifier is another optional ADT that can be computed from the features extracted from the audio signal;

Thresholds and Decision Logic are updated through the Conversation Modes module and can in turn be used to control the ADT Parameters and Output-Based Gates (e.g. the ADT Parameters and Output-Based Gates can themselves depend on the current Conversation Mode and whether certain thresholds or other conditions based on ADT data have been met); and Conversation Modes are controlled by a combination of factors including the environment, whether a remote peer is connected (e.g. VoIP channel), whether speech is detected locally or remotely, and Environment Settings.

One of the potential benefits associated with the above configuration is that certain loops may require less power to compute and/or include only low-latency processes. For example, many machine learning based ADTs and use more power and require more time to compute than a simple energy-based VAD. Hence, a simple energy-based VAD could be continually run with all other ADTs remaining inactive until it is first determined (from the simple VAD) that there is a reasonable likelihood that voice activity is present, or until it is first determined that an accurate computation is important given the current environment and Conversation Mode. At that point, more robust methods could be used and the paths used in FIG. 2 would change accordingly (i.e. the system would "turn on" higher energy ADTs after the energy-based VAD triggers a change in the Output-Based Gates via the threshold and Decision Logic conditions being met).

FIG. 2 further illustrates a system in which the Audio Detection Technologies are connected in parallel as one embodiment of the present invention. Other possible embodiments may comprise series arrangements and combinations of series and parallel arrangements. Prior to each technology there is a gate that only opens if there is an active Output Control that requires this technology. If there isn't, the gate is closed and the technology is not computed. Once the required technologies are computed, they are combined into a Supervector (further defined below) and piped to the active Output Controls. Each Output Control uses a mix of different audio technologies to decide whether or not it should output at all or the extent to which it should output (e.g. to modulate volume or intensity). Furthermore, we apply a weighting mechanism that allows certain technologies to be favored for specific Output Controls. Once the weighting is applied, a single score per Output Control can be compared with a threshold. If the threshold is passed, the Output Control is activated. This threshold is dynamic, and is controlled by the Conversation Modes (further defined below). An additional layer of Decision Logic is also indicated in FIG. 2. Decision Logic, in this instance, refers to a set of logical instructions, per Output Control, that is based on data received from the Supervector (i.e. the ADT data), Environment Settings, and Conversation Modes. It is used to make decisions about inputs, outputs, and all other aspects of FIG. 2.

The Supervector may contain scores from each of the available technologies. A subset of these scores is directly comparable such that each score can each be weighted to provide an overall weighted score. For example, each of several ADTs could output a computed probability that the user is speaking. The scores from each ADT could be weighted together to provide an overall probability that the user is speaking. In addition, the Supervector could contain additional information from each ADT. For example, depending on the technologies used, it might contain information such as raw energy measurements, number of words detected, error functions, and other parameters that could be used in decision making logic for each Output Control.

For example, if the Output Control decision is whether or not to send voice data over the network, the Decision Logic might be based on obtaining a score where the weighted probability of voice detection is greater than 70% (as determined by weighing the individual probabilities output by each of the ADTs) and where the energy measured is greater than a threshold of, for instance, 0.5 (on a scale of 0 to 1, with 1 being the maximum anticipated energy reading) in a quiet environment. The probability threshold might be increased to 75% and the energy threshold might be increased to 0.7 when the user is in a noisy environment, reflecting the fact that there is likely a higher noise floor. The higher noise floor might also make certain technologies more or less relevant than others, hence the environmental settings could also control the weights and whether the technologies are used at all via the Output-Based Gates.

The ultimate output of the system is a balanced combination of Output Controls (e.g. whether to send voice over a network, whether to duck music in response to voice detection, whether to admit sounds from the ambient environment, relative volume levels, etc.). Certain combinations of error function and score might suggest that the user changed environments and the user could be prompted to update Environment Settings (e.g. "it seems like you are no longer in a quiet office, do you want to change the environment to outdoors?"). In other cases this action could be determined through the use of an Automatic Environment Classifier. The Automatic Environment Classifier could be based on specific sound detection and/or other ADTs or processes. The specific implementation details of the Automatic Environment Classifier are left to user design preference. The Automatic Environment Classifier is an optional component that may add value to the system by making it easier to use (i.e. automating the choice of which Environment Settings to use, rather than forcing a manual selection).

Environment Settings

Environment Settings are preset groups of settings that can be easily changed depending on what is most suitable given the surrounding environment. Environment Settings are groupings of Adjustable Parameters, weights, thresholds, and Decision Logic that are used to influence which of the ADTs are emphasized and how each of them operates. If the weights for a particular ADT are set to zero for all Output Controls, the Output-Based Gate for that ADT will be closed (i.e. the ADT will not be used). Otherwise, parameters for each ADT (i.e. ADT Parameters in FIG. 2) are ultimately determined from the Environment Settings and computed for each of the relevant ADTs.

Environment Settings allow the Adjustable Parameters, weights, thresholds, and Decision Logic to be dynamically updated as the user moves from one environment to another; either using a manual control or an Automatic Environment Classifier. In some environments, it might make sense to compute technologies over a larger number of buffers at the expense of latency and CPU power. In others it might make sense to conserve power at the expense of accuracy. Additionally, certain ADTs may work well in particular environments and not in others. Specific examples help to illustrate the purpose of Environment Settings. The following are examples of named presets (i.e. Environment Settings represent the entire group of presets), though many more are possible.

Quiet Room: because noise is less likely to be present in a quiet room, latency may be prioritized to optimize user experience and therefore a shorter listening period and hangover may be used in the process. This may limit the utility of certain technologies (e.g. speech detection), so their weights would correspondingly drop or become zero so that they could be ignored.

Public Space: a public space such as an open office or a coffee shop is likely to be filled with chatter and other noise. The weight on speaker identification processes could thus be increased. Ambient microphone transparency might also be disruptive to user experience in this environment, so it would only be enabled if confidence was high that it was desired (e.g. someone is saying the user's name).

City Streets: there is a high likelihood of noise and therefore simple VAD processes may false-trigger frequently in this environment. Hence, more sophisticated processes such as an RNN VAD may be prioritized. This may increase the overall latency of the system but from a user experience perspective this would be preferable to frequent false-triggers from outdoor noises. Additionally, transparency may be activated by specific sound detection for safety reasons (e.g. approaching vehicles, sirens, etc.)

Note that combinations of Environment Settings are possible. In addition, groupings of Adjustable Parameters, weights, thresholds, and Decision Logic are also dependent on specific use cases and modes of conversation. In FIG. 2, Conversation Modes add an optional layer of customization that depends on specific modes of communication or use cases. That is, the parameters, weights, thresholds, and Decision Logic inherent in the Environment Settings can be further influenced by Conversation Modes.

Conversation Modes

Conversation Modes are a specific subset of Modes and Triggers. They are use-case-specific groupings of settings, threshold values, scores, and other Decision Logic which can be used in combination to address presumed, selected, or detected use cases. Optimal groupings depend on factors such as whether users are connected over a VoIP network, how long it has been since one of the parties has spoken, whether or not music is playing, hardware configuration (including the use of Bluetooth devices, which may limit which modes can be used), physical proximity, whether hands-free features are required for the use case, and more. Examples of possible embodiments of Conversation Modes are provided below including possible triggers for switching between modes (including but not limited to specific threshold values, scores, and other Decision Logic), and possible VAD/ADT implementations underlying the Modes and Triggers. Inherent or explicit in the examples below are that these examples may be implemented on various audio devices and use cases/applications, though they may be more relevant for some than others (for example full duplex may not be as relevant for audio devices that are speakers). In addition, the examples below are only a few of the examples of combinations of Modes and Triggers.

Full-Duplex Conversation Mode: A mode in which full duplex communication is enabled and one of the users has spoken recently. What defines "recently" could be determined by a threshold amount of time. For example, if either party has spoken (as determined by the ADTs) within the last 5 seconds, Full-Duplex Conversation Mode would be maintained and audio from all parties would be transmitted to the others continuously. If the threshold is exceeded (e.g. more than 5 seconds) without detection of speech from any connected party, the mode could be switched automatically. It could be switched into Silence Mode, for example (additional detail on switching between modes is provided below).

Half-Duplex Conversation Mode: A mode in which half-duplex communication is enabled and one of the users has spoken recently. Similarly to Full-Duplex Conversation Mode, "recently" could be determined by a threshold amount of time and maintained underneath that threshold, but rather than transmitting audio continuously in all directions, it could be limited to a single direction at any given time. For example, audio might only be transmitted by the user who was determined to speak most recently, with the highest probability, or highest priority as determined by the ADTs which might prioritize speakers based on energy levels (e.g. who is speaking loudest), a hierarchy, sentiment analysis, and other factors.

Silence Mode: A mode in which users are connected in a VoIP conversation (such as Half-Duplex Conversation Mode or Half-Duplex Conversation Mode) but one of the users has not spoken recently. For example, if nobody has spoken in the last 5 seconds, Silence Mode would kick in and microphones would cease transmission in all directions. Only keep-alive packets would be sent between the users, and an audio detection process (such as VAD) must be satisfied before audio transmission resumes. Adjustable Parameters including VAD threshold could be updated accordingly, to allow for a higher VAD threshold after a period of silence, for example.

Proximate Mode: A mode where the groups of settings, thresholds, and Decision Logic are chosen to provide for use cases where users are in close physical proximity to one another. In close physical proximity, a number of factors need to be accounted for. Some of these include the ability to see another user's mouth moving (which makes latency important), feedback loops (i.e. hearing my voice in someone else's microphone, making speaker identification and echo cancellation more important), alternative communication methods, and the fact that many use cases involving proximate users might not have access to the internet (e.g. off-grid running or cycling).

Hands-Free Mode: A mode where the hands-free features are prioritized. For example, wake word detection, speech detection, and natural language processing might be activated or prioritized in Hands-Free mode, but not all the time. Hands-Free mode might only be activated in certain environments and use cases such as while the user is riding a bicycle or driving, for example. Hands-Free mode might also require trading off against sound quality where Bluetooth is a limiting factor, hence the value of easy switching and automating that switching through the use of environmental triggers.

Headphones Mode: A mode where it has been detected that all users are wearing headphones. Echo cancellation is thus a lower priority in this mode, opening up other opportunities.

Music Mode: A mode in which it has been determined that the user is listening to music, and this must be taken into account when determining how to interact with other modes. For example, it could be the case that there is an ongoing conversation in Full-Duplex Conversation Mode, and it could further be the case the users are deliberately trying to listen to music together while connected through VoIP. In this case, music ducking and music quality would be prioritized, which could limit other functionality including hands-free controls, for example.

In FIG. 2, modes would include the Environment Settings and Conversation Modes while triggers would include the Automatic Environment Classifier, Manual Environment Controls, actions by remote peers, and changes in the network (e.g. such as the detection of silence on the network).

The utility of the system is made apparent from the following examples that illustrate automatic switching between Conversation Modes in response to changes in the environment and user behavior. Two examples are given: switching between full-duplex Conversation Mode and silence mode; and switching between half-duplex Conversation Mode and silence mode.

Method for Switching Between Full-Duplex Conversation Mode and Silence Mode.

The system for Switching between a Full-Duplex Conversation Mode and a Silence Mode may comprise:

An ADT process (such as the VAD processes depicted in FIG. 2).

A Full-Duplex Conversation Mode: full duplex communication is enabled and one of the users has spoken recently (i.e. within an adjustable amount of time, such as 5 seconds—a possible trigger). All audio from each side is transmitted to the other continuously.

A Silence Mode: full duplex communication is enabled but one of the users has not spoken recently (i.e. not within an adjustable amount of time, such as 5 seconds—a possible trigger). Only keep-alive packets are sent between the users, and an audio detection process must be satisfied before audio will be transmitted from one user to another.

A mechanism/trigger for switching from Silence Mode to Full-Duplex Conversation Mode, based on a positive detection of voice from one or more components of the VAD process.

A mechanism/trigger for switching from Full-Duplex Conversation Mode to Silence Mode, based on a negative detection (over a configurable period of time, such as 5 seconds) of voice from one or more components of the VAD process.

Upon changing from Silence Mode to Full-Duplex Conversation Mode:

The local device will update the set of Adjustable Parameters (including listening period, hangbefore, and hangover) in the VAD process according to the predefined settings for Full-Duplex Conversation Mode.

Gates controlling the transmission of voice packets over a network will open to immediately begin transmitting audio in both directions (e.g. voice detection on one device can be used to control the gates on two or more connected devices).

The remote device(s) will also update from Silence Mode to Full-Duplex Conversation Mode.

The rationale for having these modes and switching between them is that Full-Duplex Conversation Mode prioritizes latency at the expense of accuracy, while Silence Mode prioritizes accuracy at the expense of latency. In Full-Duplex Conversation Mode, there is an assumption made that one of the users is likely to speak in the near term. This assumption is based on the fact that one of the users spoke recently.

Accordingly, the VAD parameters change depending on which mode is currently active. In Full-Duplex Conversation Mode, a small sample of audio data (e.g. 50 milliseconds worth of audio buffers) may be used to detect the user's voice. In Silence Mode, a larger sample of audio data would be used (e.g. 2000 milliseconds worth of audio buffers) because the user experience would be less negatively affected by latency in the voice transmission if there has been a long period of silence since someone spoke.

For example, as a potential benefit, in mid conversation, latency in voice connections is aggravating because people talk over one another. But if a voice connection is left open for long periods of time with intermittent speech, the first speech after a period of silence (such as, "Hey are you still there?") can arrive with some latency without harming the user experience.

Decision Logic could also be used to control related Output Controls. For example, a Speed Varying Mechanism could also be used to playback the audio in a buffer at an increased rate. This allows the buffer size to reduce, and thus the delay in the playback of audio reduces over time. This leads to less latency in conversation as playback catches up. It is particularly useful in the transition from Silence Mode to Conversation Mode, where a significant buffer size may exist due to the long Listening Period in Silence Mode.

Method for Switching Between Half-Duplex Conversation Mode and Silence Mode.

The system for switching between a Half-Duplex Conversation Mode and a Silence Mode is similar to the system for switching between Full-Duplex Conversation Mode and Silence Mode except that rather than transmitting audio immediately in both directions, audio is only transmitted from the user in Half-Duplex Conversation Mode (i.e. the local device).

The rationale for this is privacy based. If there has been a long period of silence, it would potentially come as a surprise to a remote user that his microphone begins transmitting as a result of voice detection on another device. It may be desirable to force voice detection on each device independently before it begins transmitting audio.

Whenever the second user's voice is detected (a possible trigger), the mode switches automatically into Full-Duplex Conversation Mode.

An alternative trigger on the second device could be a wake word or voice command. For example, in Response Mode, the wake word or voice command could be "Respond". In this mode, the system would only activate the necessary ADTs to listen for the wake word/voice commands contextually after a Half-Duplex communication has begun. That is, if User B starts speaking to User A, then User A must utter the wake word before User A's audio will begin transmitting to User B (thus initiating a Full-Duplex Conversation Mode).

OTHER EMBODIMENTS

Having described embodiments of aspects of the present invention, it is important to note that various embodiments may be combined given a particular audio device/use case set combination (referred to as an "AD/UC" where audio device may be a set, say all mobile phones, and a use case set may be one or more use cases such as "being able to use voice commands while listening to music" and "switching to low power quickly when there is silence on a voice call"). Thus, one might start by defining an AD/UC. From there a configuration of ADTs may be selected (one or more ADTs in parallel and/or in series), for example based on capabilities of audio devices in the audio device set. As described herein those may be implemented in computer instructions that operate on signals received by audio devices. Then Adjustable Parameters, Modes and Triggers may be selected that implement proper functioning of audio devices based on the use cases and taking into account Environmental Factors and Performance Constraints. The VAD/ADT, selected modes/triggers, Adjustable Parameters and Decision Logic to produce Output Controls, may be considered an audio detection system, provided that an audio detection system need not specify or include all of the above provided it can generally process audio signals as required by the use cases.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

The invention claimed is:

1. An audio device for Contextual Audio Detection and mode switching, comprising:
    an audio input device, that receives an audio signal stream from the environment of the audio device and provides such audio signal stream to an audio detection system;
    the audio detection system, comprising a processor and non-transitory memory with computer instructions thereon, the audio detection system configured to:
        accept the audio signal stream;
        process the audio signal stream using two or more different Audio Detection Technologies (ADTs);
        use a set of output-based gates to determine which of the two or more ADTs will be executed;
        compute a supervector from the executed ADTs, the supervector constructed from the outputs of executed ADTs;
        use the supervector to compute a set of Adjustable Parameters; and
        use the set of Adjustable Parameters to update Decision Logic, the Decision Logic being a set of instructions that performs updating instructions for processing Output Controls, the Output Controls comprising one or more outputs from the audio detecting system; and, updating instructions for processing the ADTs,
    wherein the Output Controls further comprise one or more of:
        determining whether to send a voice audio signal over a network;
        determining whether to enable, disable or modulate noise cancellation on a connected headphone device;
        determining whether to admit ambient sounds from a connected microphone device;
        determining whether to modulate audio volume on a connected device;
        determining whether to apply effects to an ambient signal; and
        determining whether to apply effects to media on a connected device, and
    wherein activation of the Output Controls is further based on which ADTs are executed.

2. The audio device of claim 1 wherein the audio detection system further comprises two or more ADTs connected in parallel.

3. The audio device of claim 2 wherein the audio detection system further comprises instructions for selecting which of the ADTs to compute.

4. The audio device of claim 1 wherein the audio detection system further comprises Modes and Triggers that are used to modulate the Adjustable Parameters and the Decision Logic.

5. The audio device of claim 4 wherein a Mode is automatically triggered by an audio detection process.

6. The audio device of claim 5 wherein an Automatic Environment Classifier is used to modulate the Adjustable Parameters and Decision Logic.

7. The audio device of claim 1, further comprising a set of Environment Settings, the Environmental Settings comprising groupings of one or more of: Adjustable Parameters, weights, thresholds, and the Decision Logic that are used to modulate a set of Per-Output Weights, each Per-Output Weight comprising a variable that modulates the relative influence of each ADT.

8. The audio device of claim 1, further comprising a Conversation Modes, the Conversation Modes comprising groupings of one or more settings, threshold values, scores, and Decision Logic.

9. The audio device of claim 8, further comprising a speed-varying mechanism operative to modulate the rate of playback of audio from an audio buffer.

10. The audio device of claim 8, further comprising a Response Mode to activate the Conversation Mode in response to a voice command word.

11. The audio device of claim 8, further comprising one or more of:
    a Full-Duplex Conversation Mode where full duplex communication is enabled and one of the users has spoken recently;
    a Half-Duplex Conversation Mode where half-duplex communication is enabled and one of the users has spoken recently;
    a Silence Mode where users are connected in a VoIP conversation but one of the users has not spoken recently;
    a Proximate Mode where it has been determined that users are in close physical proximity to one another;
    a Hands-Free Mode where one or more wake word detection, speech detection, and natural language processing is prioritized;
    a Headphones Mode where it has been detected that all users are wearing headphones; and
    a Music Mode where it has been determined that the user is listening to music.

12. The audio device of claim 11, further comprising a method for switching between Full-Duplex Conversation Mode and Silence Mode wherein the mode is determined by the detection of speech during an active full-duplex voice over IP connection.

13. The audio device of claim 11, further comprising a method for switching between Half-Duplex Conversation Mode and Silence Mode wherein the mode is determined by the detection of speech during an active half-duplex voice over IP connection.

14. A method of Contextual Audio Detection for an audio device, comprising:
    providing a set of instructions containing two or more different Audio Detection Technologies (ADTs) and one or more adjustable ADT parameters;

using the ADT parameters as inputs for computing the Audio Detection Technologies;

extracting features from an audio signal and passing the features into one or more of the ADTs;

constructing a supervector from the outputs of the ADTs; and applying the supervector to Decision Logic to implement one or more Output Controls, wherein the Output Controls further comprise one or more of:
  determining whether to send a voice audio signal over a network;
  determining whether to enable, disable or modulate noise cancellation on a connected headphone device;
  determining whether to admit ambient sounds from a connected microphone device;
  determining whether to modulate audio volume on a connected device;
  determining whether to apply effects to an ambient signal; and
  determining whether to apply effects to media on a connected device, and wherein activation of the Output Controls is further based on which ADTs are computed.

15. The method of claim 14, further comprising passing the supervector to a set of instructions to update parameters that can be used to help control the relative influence of each ADT.

16. The method of claim 14, further comprising:
passing the supervector to a set of logical instructions, code, variables, or decision logic to affect one or more of:
  a first set of gates that determine whether or not to send a voice audio signal over a network;
  a second set of gates that turn noise cancellation on headphones on or off, and other controls that modulate noise cancellation;
  a third set of gates that control whether or not ambient sounds are admitted to a headset via a locally connected microphone and other controls that modulate the volume of the ambient signal or apply effects to the ambient signal; and
  one or more controls that apply effects or modulate the audio volume and other aspects of media on another device.

17. The method of claim 14, further comprising:
providing a set of instructions containing two more Audio Detection Technologies connected in parallel and;
providing a set of instructions that dictates which of the Audio Detection Technologies should be computed.

18. A method of Contextual Audio Detection, comprising:
providing an input audio signal;
passing the audio input to two or more different Audio Detection Technologies (ADTs);
computing the Audio Detection Technologies into a supervector; and
using the supervector obtained from the ADTs to update instructions comprising:
  providing a set of Adjustable Parameters & additional Decision Logic that modulates one or more Output Controls; how the Audio Detection Technologies are processed; and a combination thereof; and
  providing Modes and Triggers that are used to modulate the Adjustable Parameters and Decision Logic, wherein the Output Controls further comprise one or more of:
  determining whether to send a voice audio signal over a network;
  determining whether to enable, disable or modulate noise cancellation on a connected headphone device;
  determining whether to admit ambient sounds from a connected microphone device;
  determining whether to modulate audio volume on a connected device;
  determining whether to apply effects to an ambient signal; and
  determining whether to apply effects to media on a connected device, and
wherein activation of Output Controls is further based on which ADTs are computed.

19. The method of claim 18, further comprising:
providing a set of ADT Parameters that determine how each of the ADTs will be run;
providing a set of Output-Based Gates which determine which of the ADTs will be run;
receiving an audio signal through a microphone or microphone array; and
executing one or more of the following steps:
  preprocessing the input audio data and optimizing it for analysis;
  extracting features from the audio signal, copying them, and routing them to multiple ADTs to be processed in parallel;
  computing ADTs and outputting relevant scores, error functions, and decision variables ("ADT data");
  feeding ADT data into a supervector which is in turn referenced by Output Controls;
  weighting ADT data for each Output Control according to its relevance;
  comparing the weighted ADP outputs against a threshold;
  using the ADP outputs to drive Decision Logic that modulates Output Controls;
  using Environment Settings, the Environmental setting comprised of groupings of Adjustable Parameters, weights, thresholds, and Decision Logic, to influence which of the ADTs are emphasized;
  manually selecting the Environment Settings;
  automatically selecting the Environment Settings using an Automatic Environment Classifier that computes the environment from features extracted from the audio signal;
  updating thresholds and decision logic through Conversation Modes, where Conversation Modes are sets of instructions that depend on one of more of speech detection, whether a remote peer is connected, and Environment Settings; and
  updating ADT Parameters and Output-Based Gates through Conversation Modes.

* * * * *